United States Patent
Nakamura

(10) Patent No.: US 6,227,064 B1
(45) Date of Patent: May 8, 2001

(54) POWER STEERING APPARATUS

(75) Inventor: Masahide Nakamura, Kashihara (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 09/173,036

(22) Filed: Oct. 15, 1998

Related U.S. Application Data

(63) Continuation of application No. 09/173,036, filed on Oct. 15, 1998, and a continuation of application No. PCT/JP98/00848, filed on Feb. 27, 1998.

(30) Foreign Application Priority Data

Feb. 28, 1998 (JP) ................................................. 9-045444

(51) Int. Cl.[7] .................................................... B62D 5/04
(52) U.S. Cl. ..................... 74/388 PS; 74/459; 74/499; 180/443
(58) Field of Search .................. 74/388 PS, 499, 74/89.15, 424.8 R, 459; 180/443, 444

(56) References Cited

U.S. PATENT DOCUMENTS

| | | | |
|---|---|---|---|
| 2,482,082 | * 9/1949 | Wahlberg | 74/459 |
| 2,616,302 | * 11/1952 | Wahlmark | 74/459 |
| 3,614,900 | * 10/1971 | Wahlmark | 74/459 |
| 4,322,987 | * 4/1982 | Gartner | 74/424.8 R |
| 4,856,356 | * 8/1989 | Gartner | 74/424.8 R |
| 5,533,417 | * 7/1996 | Devenyi | 74/424.8 R |

FOREIGN PATENT DOCUMENTS

| | | | |
|---|---|---|---|
| 3417056 | * 11/1985 | (DE) | 74/459 |
| 61-191468 | 8/1986 | (JP) | . |
| 4-321471 | 11/1992 | (JP) | . |
| 6-72341 | 3/1994 | (JP) | . |
| 8-20351 | 1/1996 | (JP) | . |

* cited by examiner

Primary Examiner—David A. Bucci
Assistant Examiner—William C Joyce
(74) Attorney, Agent, or Firm—Darby & Darby

(57) ABSTRACT

A power steering apparatus is furnished with a rotary cylinder supported by restraining the movement in the axial direction and rotating coaxially with a steering shaft by the transmission of movement from the motor, a feed ring fixed in the rotary cylinder with eccentricity by a predetermined angle and a predetermined distance to the axial center of the steering shaft or a plurality of feed rings which are fixedly disposed in inclination at equal angle and eccentricity in equal distance to the axial center of the steering shaft, being fixed to the inside of the rotary cylinder with equal disposition of the respective eccentric positions in the circumferential direction, thus it generates low noise and can convert rotation of the motor to movement of the steering shaft in the axial direction to take the place of a ball screw mechanism, and can be constituted by a simple structure.

11 Claims, 6 Drawing Sheets

POWER STEERING APPARATUS

This is a continuation of international application Ser. No. PCT/JP98/00848, filed Feb. 27, 1998. This is a continuation of application Ser. No. 9/173,036, filed Oct. 15, 1998. The most recent of these prior applications is hereby incorporated herein by reference, in its entirety.

FIELD OF THE INVENTION

The present invention relates to a power steering apparatus comprising a motor as a power-source of the steering assisting force.

DESCRIPTION OF RELATED ART

Power steering apparatus is intended to alleviate the burden required for steering by rotating a steering wheel, and to receive favorable steering feeling such apparatus is equipped in many automobiles. Furthermore, in recent years there has been practically employed an electric power steering apparatus utilizing an electric motor which is driven according to the operation of the steering wheel, instead of the hydraulic actuator extensively used conventionally.

Such power steering apparatus has a merit of elastically conforming to the change of the properties of the assisting force according to the operating conditions, such as HI/LOW vehicle speed, LARGE/SMALL steering angle, and the like, by control of motor driving for steering assistance, however, in realization of such control, a transmission system for transmitting the rotation of the motor for steering assistance to the steering mechanism is essential.

The motor for steering assistance is provided in linkage with the steering wheel. The motor is connected with the middle portion of a steering column which rotates according to steering of the steering wheel, or the motor is provided at the middle portion of a steering shaft, both ends of which are connected with traveling wheels (in general, right and left front traveling wheels), for steering by shifting in the axial direction (e.g., a rack shaft in the rack-pinion type steering mechanism). In the former, however the rotation of the motor for steering assistance is to be transmitted to the steering column which is a rotary member, and while there is a benefit that the above transmission system can be simply constituted by a general gearwheel reduction mechanism, the exposed portion of the steering column is small, so that it is difficult to secure a installation position for the transmission system including said motor, and there is an inconvenience that the application range could be limited.

Against the above, however the latter has the complicated constitution of a transmission system for converting the rotation of the motor for steering assistance into the shift of the steering shaft in the axial direction, it offers flexibility for arranging positions of the transmission system including the motor over the axial length of the steering shaft arranged to the right and left in the body of the vehicle, and has an advantage of applicability to extensive kinds of vehicles. However, even in this constitution, reducing the space for arranging the transmission system including the motor as above is an important task. For example, as disclosed in Japanese Patent Laid-open Publication No. S61-191468, a power steering apparatus aiming at reducing the installation space by using a ball screw mechanism for the above transmission system has so far been proposed.

This power steering apparatus employs a portion of the steering shaft as a male screw member on the outer periphery of which a thread of the ball screw is formed, on the outside of the male screw member, there are arranged the nut members which are screw connected through a large number of balls with movement restrained in the axial direction in the housing for supporting the steering shaft, and the rotation force from the motor for steering assistance is transmitted to the nut member. Thus, according to the rotation the steering shaft is shifted in the axial direction by utilizing the screw advance of the ball screw. By this means, it is possible to constitute a transmission mechanism that gives a large reduction ratio inside said housing, and by mounting the miniaturized motor near the housing of the steering shaft, the requirements for reducing the layout space as described above can be met.

However, the conventional constitution as above requires high precision for forming the ball screw thread in the outer periphery of the steering shaft, for which a large number of steps are required for processing; moreover, a great amount of labor is required for adjusting screw engagements between the ball screw threaded male screw member and the nut member.

The balls which are filled in the ball screw thread in the nut member move in rotation in the screw groove according to the screw advance of the balls screw to smooth the movement of the steering shaft, but at the same time the balls deflect by their rotational movement in the direction of movement of the steering shaft. In order to prevent this deflection, there are provided bypass mechanisms for moving the balls in circulation at the right and left ends in the nut member, thereby supporting smooth movement in rotation of the balls. However, the bypass mechanisms constituted in the nut member are extremely complicated, involving the problems that owing to the large number of parts constituting the mechanisms, increases are caused in the number of steps for assembly and cost.

Furthermore, there is another problem that in the above bypass mechanism and ball screw thread, because there is no retaining member to keep the distance between the balls constant, the balls collide against one another and the noise generated thereby is large.

The present invention has been made in reflection of the situation as above. An object of the invention is to provide a power steering apparatus which generates low noise and which can securely convert the rotation of the motor for steering assistance to the movement of the steering shaft in the axial direction by a transmission system having a simple constitution to take the place of the ball screw mechanism. Thereby it is possible to meet the requirements for reducing the installation space of the transmission system including the steering assistance motor and simplifying the adjustment work at the assembly.

SUMMARY OF THE INVENTION

The power steering apparatus of the present invention is constructed support steering by transmitting the rotational force of the motor driven according to the steering of the steering shaft supported in the housing, and to move. The steering shaft in the axial direction, the apparatus comprises a rotary cylinder supported in the housing so as to restrain its movement in the axial direction and so as to rotate coaxially with said steering shaft by the transmission of movement from the motor, a feed ring is eccentrically fixed in the rotary cylinder by a predetermined angle and at a predetermined distance to the axial center of the steering shaft, alternately a plurality of feed rings are fixedly disposed in inclination at equal angles and eccentricity in equal distance to the axial center of said steering shaft, being fixed to the inside of the rotary cylinder with equal disposition of the respective eccentric positions in the circumferential direction in inclination at equal angle and eccentricity in equal distance to the axial center of said steering shaft.

FIG. 1 shows an explanatory view for illustrating the principle of converting the rotation of the feed ring of the present invention to the movement in axial direction of the steering shaft. The steering shaft 101 is supported so as to allow shift in the axial direction only. The feed ring 163 has steering shaft 101 inserted through its inner circumferential portion, the inner diameter is larger than the outer diameter of the steering shaft 101, and the feed ring 163 is disposed eccentrically to the axial center of the steering shaft 101 so as to come into contact with the outer circumferential surface of the steering shaft 101 at one place of the inner circumferential surface of the feed ring 163. Further, the axial center of the feed ring 163 is incline at an angle θ to the axial center of the steering shaft 101.

When the feed ring 163 having such constitution rotates around the axial center of the steering shaft 101; for example, in the white base arrow mark direction around the axial center of the steering shaft 101, the feed ring 163 rotates around the steering shaft 101 while being in contact with the steering shaft 101 always at the same position on the inner circumferential surface thereof. As the feed ring 163 shows a tendency to make screw advance in the direction of inclination (at an angle θ to the direction of rotation), like a female screw, and the friction force F acts in the inclination direction at the contact portion, the shift of the steering shaft 101 in the axial direction can be attained by the component force Fsin θ in the axial direction of the steering shaft 101 at that time.

Therefore, the single or plural feed rings provided are inclined relating to the axial center of the steering shaft in the rotary cylinder and rotate in sliding contact with a single spot on the outer circumferential surface of the steering shaft, and they move the steering shaft in its axial direction with the pitch of the inclination angle of the feed ring taken as the lead angle thereof. Thus, it is impossible to convert the rotation of the motor for steering assistance to the movement in axial direction of the steering shaft by a simple mechanism, and further no ball is required. Accordingly, there is no generation of noise as described above Another power steering apparatus of the present invention is characterized in that the feed ring is provided with a projection on its inner circumferential surface, and the steering shaft has a spiral groove provided on its outer circumferential surface, so that the projecting portion of the feed ring comes into sliding contact with the groove of the steering shaft.

Therefore, since it is so arranged that the projection provided on the inner circumferential surface of the feed ring is in sliding contact with the groove of the screw-like steering shaft, there is no generation of sliding of the steering shaft in the sliding portion to the axial direction, and the motor rotation of the steering assistance in the sliding portion can be assuredly converted to the movement in the axial direction of the steering shaft.

Another power steering apparatus of the present invention is characterized by having a pillar shaped holder which is fixed in the rotary cylinder and holding said feed ring, and said holder is furnished with a columnar recess for holding the feed ring with the axial center being inclined or eccentric to said steering shaft and a hole through which said steering shaft can be inserted at the bottom portion.

Therefore, as said holding member holds the feed ring in an inclined or eccentric mode in the rotary cylinder, it is possible to facilitate the assembly of the feed ring to said rotary cylinder.

Still another power steering apparatus of the present invention is characterized in that the groove portion of said steering shaft is formed in a pitch such that the inclination angle of the feed ring is a lead angle.

Therefore, the above projection slides along the direction of inclination of the above feed ring and can move smoothly.

A still further power steering apparatus of the present invention is characterized in that the feed ring is formed by using a bearing.

Therefore, according to the rotation of the rotary cylinder around its shaft, following the outer ring of the bearing which is rotated in inclined state, at the start of rotation of the inner ring of the bearing in the direction different from that of normal rotation of the bearing, the shock of rotation is absorbed by the elasticity between the ball race of the inner and outer rings and the balls, and the impact noise can be reduced. Also, by using the commonly used bearing, the feed ring can be constituted at a low cost.

Another power steering apparatus of the present invention is a bottomed cylindrical member having at the middle portion of the bottom a hole through which the steering shaft can be through, comprising an inner circumferential surface with inclined or eccentric axial center to the outer circumferential surface, and an inner bottom surface which is provided at a right angle to the direction of inclination of said inner circumferential surface, with the circumferential wall lacking over more than half the round of the inner circumferential surface, a screw hole being provided in the radial direction of the circumferential wall on the position opposite to the lacking portion on said circumferential wall, so that the adjusting screw projecting from the outside of said circumferential wall to inside is to screw mate with the screw hole.

Therefore, as the foremost end of said adjusting screw projects from the inner circumferential surface of the holding member to push out the feed ring in the direction of the lacking portion, the sliding contact pressure of the feed ring to the steering shaft can be adjusted.

Another power steering apparatus of the present invention is characterized in that the axial center of the recess held by the holder is inclined by the same angle as that of the feed ring, and is eccentric with the steering shaft by the same distance as that of the feed ring.

Therefore, as the holder holds the feed ring at the angle to be inclined and in the distance to be made eccentric, the assembly of the feed ring to the rotary cylinder can be further facilitated.

DESCRIPTION OF THE PREFERRED EMBODIMENTS (First Embodiment)

Figure 2:
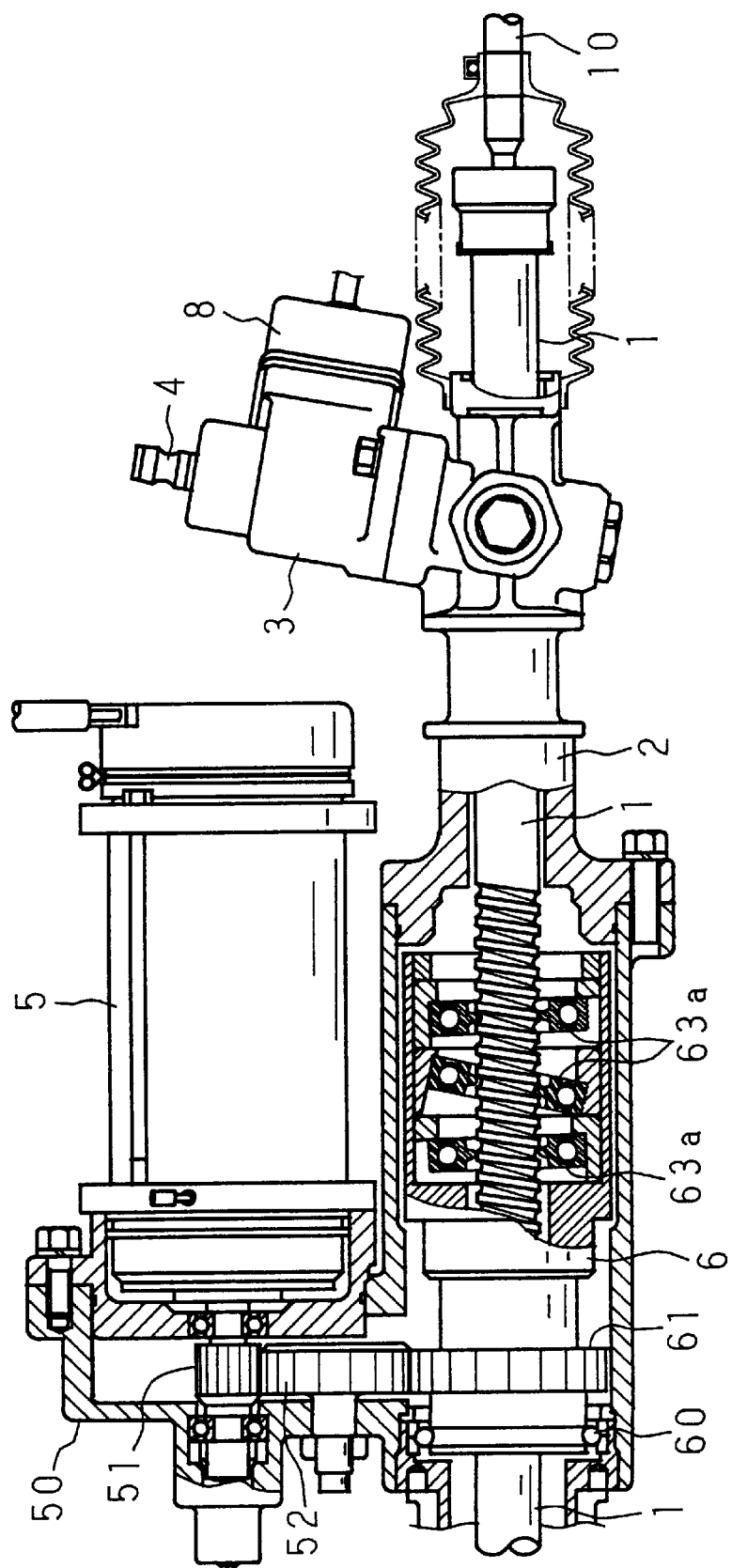
FIG. 2 is a portionially broken front elevation view showing the constitution of the essential portion of the power steering apparatus of the present invention.

Hereinafter, the present invention is explained in detail based on the drawing which shows its embodiment. FIG. 2 is a portionially broken front elevation view showing the constitution of the essential portion of the power steering apparatus of the present invention.

In this power steering apparatus, the steering shaft 1 (rack shaft) is supported in freely movable manner in the axial direction inside of the cylindrical steering shaft housing 2 which is provided in the right-left direction of the vehicle body. And, at the ends of the steering shaft 1 projecting respectively to the right and left of the steering shaft housing 2, the non-illustrated right and left traveling wheels are connected via respective tie-rods 10, 10 (one side only being illustrated), as the movements to right and left of the steering shaft 1 in the steering shaft housing 2 are transmitted to the right and left traveling wheels through the tie-rods 10, 10 and they are converted for steering.

At the half-way portion of the steering shaft housing 2, there is connected a pinion housing 3 with the axial center crossed therewith. Inside of the pinion housing 3, a pinion shaft 4 is supported in freely rotatable manner around its axial center. In FIG. 2, the pinion shaft 4 is shown only at the projecting end to the upper portion of the pinion housing 3. It is connected to the non-illustrated steering wheel via the projecting end, and according to the operation of the steering wheel for steering, it is rotated around its axis.

On the lower portion of the pinion shaft 4 provided inside the pinion housing 3 there is formed a non-illustrated pinion in one piece. Further, on the steering shaft 1 which is supported in the steering shaft housing 2, there is formed a non-illustrated rack gear over a moderate length including the crossing point with the pinion housing 3, by which the rotation of the pinion shaft 4 is converted to the movement of the steering shaft 1 in the axial direction by the engagement of the pinion and the rack gear thus constituting the steering mechanism of rack pinion type in which the right and left traveling wheels connected to the right and left ends of the steering shaft 1 are operated according to the operation of the steering wheel.

The power steering apparatus of the present invention has a constitution to subsidize the steering which is performed as described above by the rotational force of an electric motor. In the embodiment shown in FIG. 2, the motor 5 for steering assistance is fixed to the outside of the steering shaft housing 2. To the steering shaft housing 2 there is provided in projection a cylinder shaped motor base 50 made by bending the opening portion in parallel with the steering shaft 1 and extending at a position which is separated by a moderate length from the position at which the pinion housing 3 is provided, and the motor 5 for steering assistance is fixed to the above opening portion of the motor base 50 with its output shaft arranged in approximately parallel with the steering shaft housing 2 and the internal steering shaft 1.

Inside of the motor base 50 is a hollow portion communicating with inside of the steering shaft housing 2, and the output shaft of the motor 5 is extended to the inside of the hollow portion. At the end portion of the output shaft there is provided a driving pinion 51 which is in gear engagement with a spur gear 52 which is freely rotatably supported inside the motor base 50.

On the other hand, inside the steering shaft housing 2, a rotary cylinder 6 is stored so as to be in coordination with the position in which the motor base 50 is provided. The rotary cylinder 6 is a cylindrical member which is supported inside the steering shaft housing 2 under allowance of only the rotation coaxial with the steering shaft by the 4-point contact ball bearing 60 which is formed integrally with one side thereof, and the steering shaft 1 which is inserted through the inside of the steering shaft housing 2 is inserted through the inside of the rotary cylinder 6.

Outside the rotary cylinder 6 which is supported in this manner, a spur gear 61 is integrally formed on the position coordinate with the motor base 50, and is geared with the spur gear 52 which comes into the same position from the side of the motor base 50. And, the above rotary cylinder 6 keeps the restraint position in axial direction by the 4-point contact ball bearing 60 by the rotation of the motor 5 which is conveyed through the pinion 51, spur gear 52 and spur gear 61, and rotates coaxially with the steering shaft 1 inside of the steering shaft housing 2.

Figure 3:
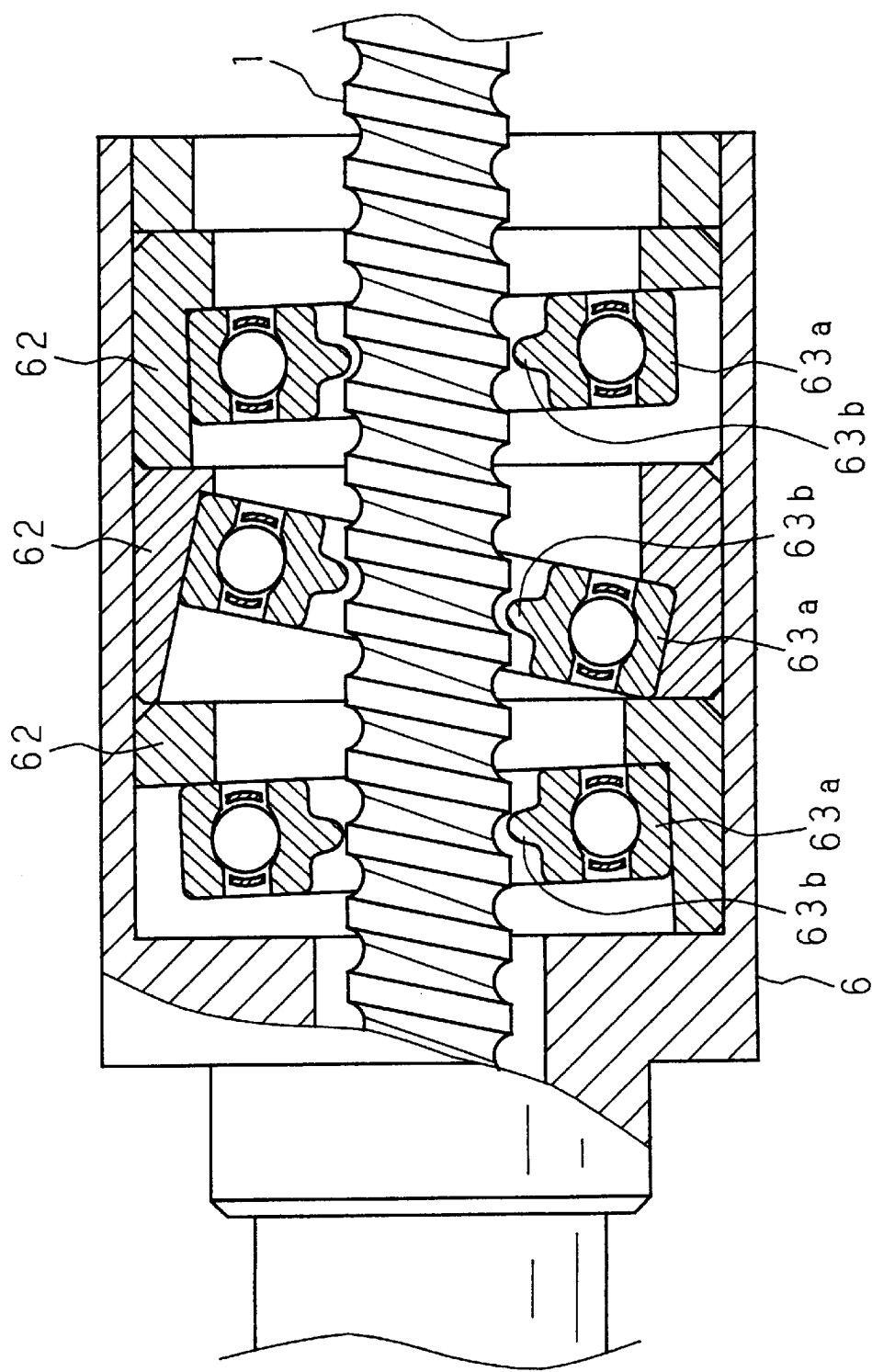
FIG. 3 is a portionial enlarged view of FIG. 2.

FIG. 3 shows a portionially enlarged view of FIG. 2. On the other side of the above rotary cylinder 6 a cylindrical enlarged-diameter portion is integrally formed coaxially, and on the hollow portion formed inside, there are provided three bearing holders 62, 62, 62 for holding the three ball bearings 63a, 63a, 63a which function as the feed rings, coaxially with the steering shaft 1.

Figure 4:
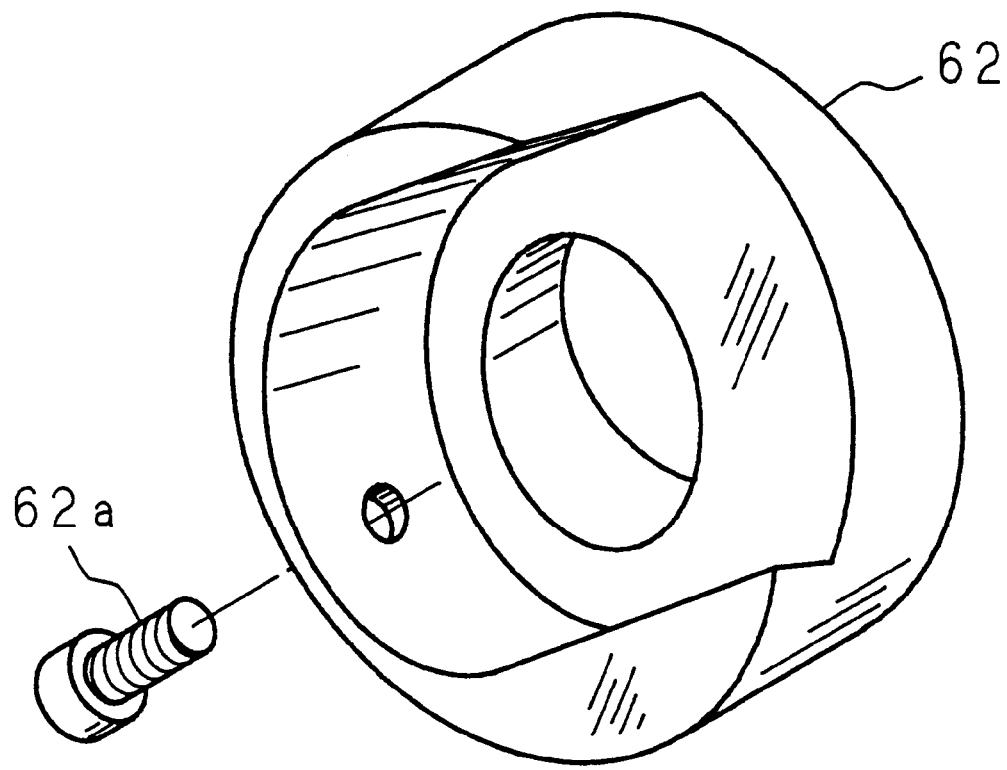
FIG. 4 is a perspective view showing the bearing holder.

FIG. 4 is a perspective view showing the bearing holder 62. The bearing holder 62 comprises, as illustrated, a short columnar member, having proper thickness in its diametral and axial direction so that a steering shaft 1 can be inserted in the hollow portion. And, the columnar recess with which the above ball bearing 63a can mate is inclined by the predetermined angle to the axial center of the outer circumferential surface of the bearing holder 62, and it is provided with eccentricity given by a predetermined distance in the direction crossing at right angle to the direction of inclination from an end of the above bearing holder 62. The circumferential wall of the bearing holder 62 surrounding the above recess portion is lacking over 180 degrees centering on the above eccentric direction of the inner circumferential surface, and on the outer circumferential wall on the opposite side to the above direction a screw hole is bored. The foremost end portion of the adjusting screw 62a which is fastened from the outside thrusts from the inner circumferential surface of the outer circumferential wall to push out the engaged ball bearing 63a in the lacking direction of the outer circumferential wall so as to make the pressure of the ball bearing 63a sliding contact with the steering shaft 1 adjustable.

Also, utilizing the inclination angles of the above ball bearings 63a, 63a, 63a as lead angle, there is formed a spiral groove of appropriate length on the outer circumferential surface of the steering shaft 1 in an axial direction. By engagement with a portion of the projecting portion 63b, 63b, 63b provided to be in coordination therewith on the inner circumferential surface of the above, the sliding in the axial direction of the steering shaft 1 is suppressed.

The bearing holders 62, 62, 62 holding the above ball bearings 63a, 63a, 63a are provided in the above rotary cylinders 6, respectively, under the condition of being displaced by 120 degrees each so that the sliding contact positions of the three ball bearings 63a, 63a, 63a which come into sliding contact with the outer circumferential surface of the steering shaft 1 at one point become uniform in the circumferential direction of the steering shaft 1.

As the friction force on the contact surface between the projecting portion 63b, 63b, 63b of the ball bearings 63a, 63a, 63a and the spiral groove of the steering shaft 1 becomes very large, traction grease (lubricant oil for roll transfer) is applied to the whole sliding surface and the torque is conveyed through the oil film of the lubricant oil of the contact surface. The traction grease has such properties that the viscosity of the oil film at the contact surface becomes higher according to the increase of the contact pressure, and the oil film is instantly solidified in glass form under the high contact pressure, but after release from the contact surface, the film instantly regains the original fluidity. As the shearing force of the instantly formed glass form oil film is very large, sliding at the contact surface is alleviated to attain the high transmission efficiency of the torque. This is commercialized as SUN TRACK (lubricant for roll transfer made by Monsanto, USA).

Figure 1:
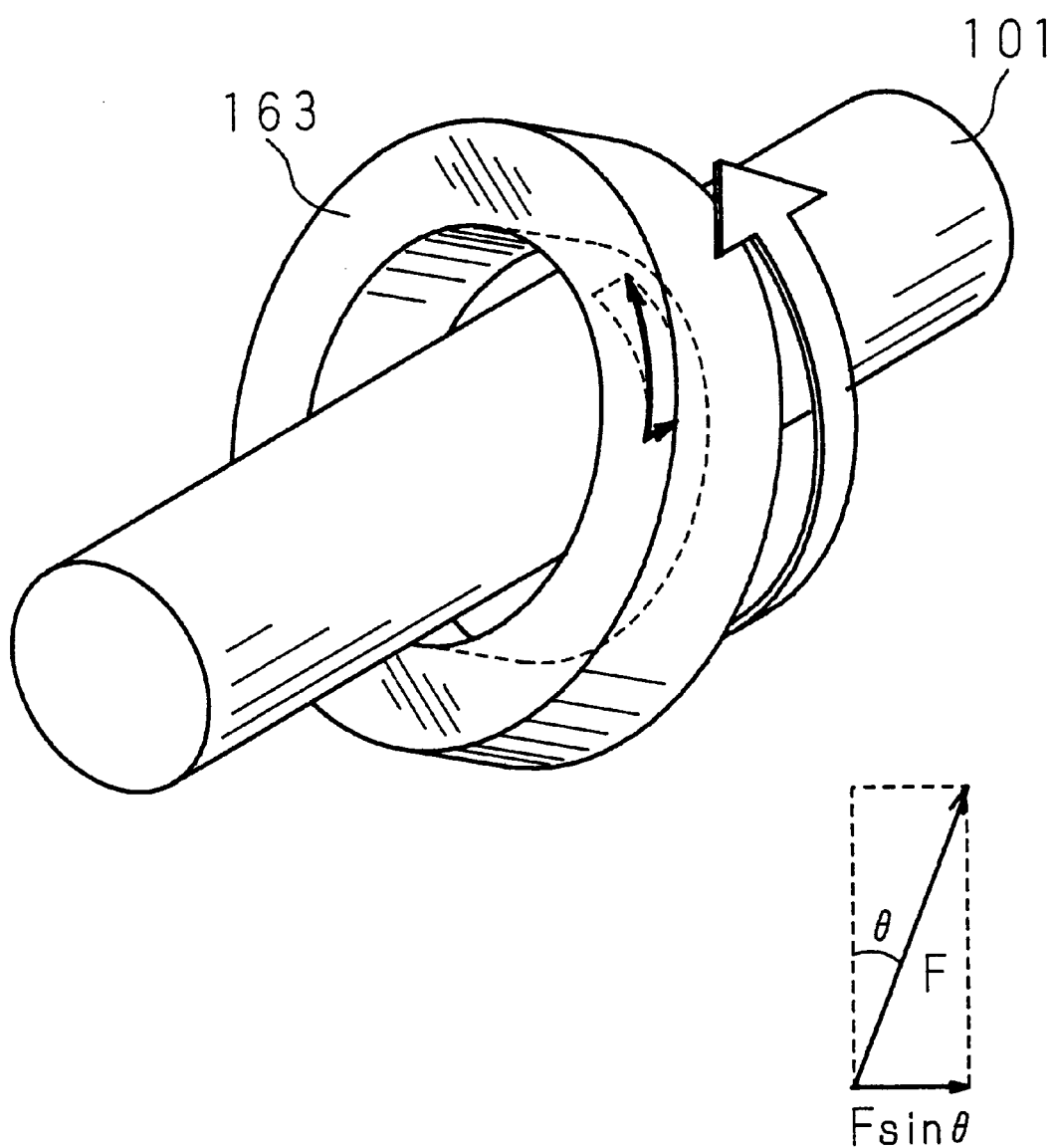
FIG. 1 is an explanatory view for illustrating the principle of converting the rotation of the feed ring of the present invention to the movement in the axial direction of the steering shaft.

In the power steering apparatus constituted as above, the outer rings of the ball bearings 63a, 63a, 63a are provided in fixed state respectively to the rotary cylinder 6 through the bearing holders 62, 62, 62 in a mode of inclination of the axial center to the steering shaft 1. Accordingly, they rotate under preservation of the inclination angle to the steering shaft 1 according to the rotation of the rotary cylinder 6. Since the above outer rings rotate in the direction different from the normal direction of rotation of the ball bearings 63a, 63a, 63a, the inner rings of the ball bearings 63a, 63a, 63a maintain the condition of agreements in the inclination angle and inclination direction of the above outer rings, and rotate following the outer rings. The stress by the resistance which is generated at the sliding portion at the time of the initial movement is absorbed by the balls of the ball bearings 63a, 63a, 63a and the ball race by the elasticity. And, as the principle of the motion shown in FIG. 1, the sliding movements between a portion of the projecting portion 63b, 63b, 63b which are provided on the inner circumferential surfaces of the ball bearings 63a, 63a, 63a and the spiral groove provided on the outer circumferential surface of the steering shaft 1 is converted to the movement of the steering shaft 1 in the axial direction and steering is carried out.

In the above, in the constitution of the power steering apparatus according to the present invention, there was described about the case where the steering shaft 1 is the rack shaft in the rack pinion type steering mechanism. The steering shaft 1 can be any shaft for shifting the traveling wheels according to the shift in the axial direction, and it is not limited to the above rack shaft. For example, there are some among the power steering apparatuses that are provided with the shafts for exclusive use of the steering assistance in a separate body from the rack shaft, and the former shaft and the rack shaft are connected in a portion of the respective ones, so that the rotation of the motor for steering assistance is transmitted to the rack shaft via the shaft for exclusive use of the steering assistance. Such a shaft for exclusive use of the steering assistance is also included in the steering shaft of the present invention. Furthermore, it goes without saying that the application range of the present invention is not limited to the rack pinion type steering mechanism as described above but the application to other type of steering mechanism is also possible. Further, the present invention is applicable to the case where no screw groove is provided on the outer circumferential surface of the steering shaft 1.

Furthermore, the constitution may be such as to use a hydraulic motor as the motor 5 for the steering assistance use.

The sectional shape of the projecting portion 63b of the above ball bearing 63a and the sectional shape of the spiral groove of the above steering shaft 1 can be formed in various shapes depending on the size, direction, etc. of the load to the steering shaft 1. For example, by using the ball screw thread, it becomes possible to use the male screw portion of the ball screw mechanism as the steering shaft 1. Further, by using square thread screw or trapezoidal thread screw which are easier to produce than the ball screw thread, the processing steps can be reduced.

While the constitution is to use a ball bearing 63a as a feed ring, depending on the size, kind, etc. of the load to be applied to the feed ring, other commonly used bearings such as angular ball bearings, conical roll bearings, and the like may be used, without being limited to the ball bearing. Further, needless to say, without being limited to the ball bearing, the ring members provided with projections on the inner circumferential surface are usable.

Furthermore, while three of the ball bearings 63a are exemplified to be used, the sliding contact positions of the steering shaft 1 to the outer circumferential surface may be equally distributed in the circumferential direction of the steering shaft 1. Without limiting to the above, the number of the ball bearings 63a may be more than four. However, when the number of the ball bearings 63a is to be one or two, it is difficult to secure the balance of the sliding contact pressure to be exerted to the steering shaft 1. Therefore provision of more than three ball bearings 63a is desirable.

The above bearing holder 62 may be held in a manner that the ball bearing 63a as an advance ring may be inclined to the axial center of the steering shaft 1 and to be in sliding contact with the outer circumference of the above steering shaft 1 at one spot of the inner circumferential surface thereof. The constitution may be such as not to be provided with any of the above adjusting screw 62a, the screw hole to accommodate it, or the above lacking portion. With respect to the recess for holding the ball bearing 63a of the bearing holder 62, the bearing holder 62 may be set either inclined or eccentric inside the rotary cylinder 6, by which either the inclination or eccentricity of the recess can be omitted. Furthermore, the outer circumferential shape of the above bearing holder 62 need not be circular but may be equilateral triangle, thereby making it unnecessary to adjust the positions in the circumferential directions of three ball bearings 63a, 63a, 63a. Thus, the shape of the outer circumference is not limited.

(Second Embodiment)

Figure 5:
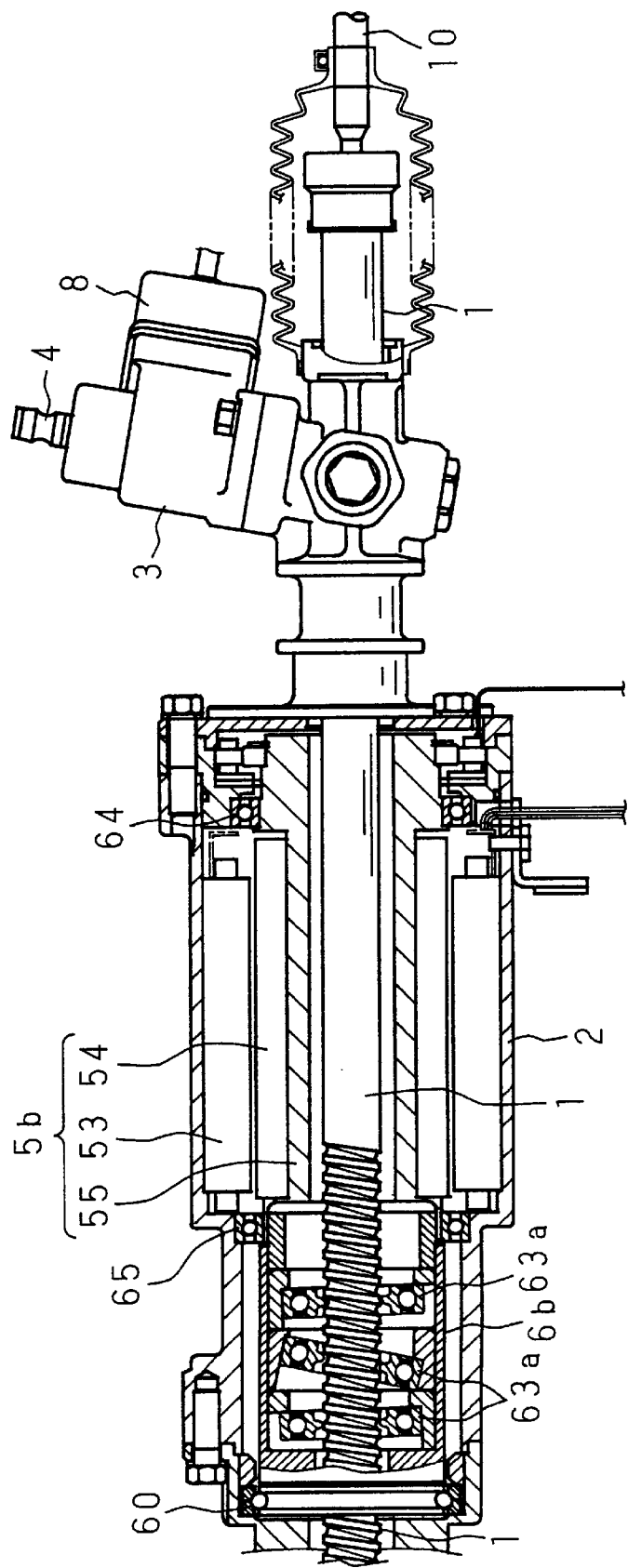
FIG. 5 is a portionially broken front elevation view showing still another embodiment of the present invention.

FIG. 5 shows a portionially broken front elevation view showing another embodiment of the present invention. The power steering apparatus in this embodiment is different from that of the first embodiment in the point of using the brushless motor 5b disposed in coaxial manner with the steering shaft 1 in place of the motor 5 of the first embodiment. In the second embodiment, because of the coaxial disposition of the brushless motor 5b with the steering shaft 1, the constitution can be more compact than in the first embodiment.

In FIG. 5, in the inner surface of the housing 2, a stator 53 is circumferentially provided. In the inner surface of the stator 53, a plurality of permanent magnets 54 are provided opposite to and with some gap on the outer circumferential surface of the cylindrical rotor 55 which is longer than the stator 53, with the magnetic pole being differentiated from that of other adjacent permanent magnet 54. The rotor 55 is freely rotatably supported on the inner surface of the housing 2 at one end by the ball bearing 64 through the fitting member and at the other end by the similar ball bearing 65, and by these components the brushless motor 5b for steering assistance is constituted.

On the other side of the rotor 55, a rotary cylinder 6b is coaxially press fitted, and being supported in freely rotatable manner together with the rotor 55 on the inner surface of the housing 2 by the 4-point contact ball bearing 60 at the end portion on the pressure input side of the rotary cylinder 6b.

Under such constitution, when the stator 53 is energized, the rotor 55 rotates along with the permanent magnet 54, by which the rotary cylinder 6b connected integrally with the rotor 55 is rotated.

Figure 6:
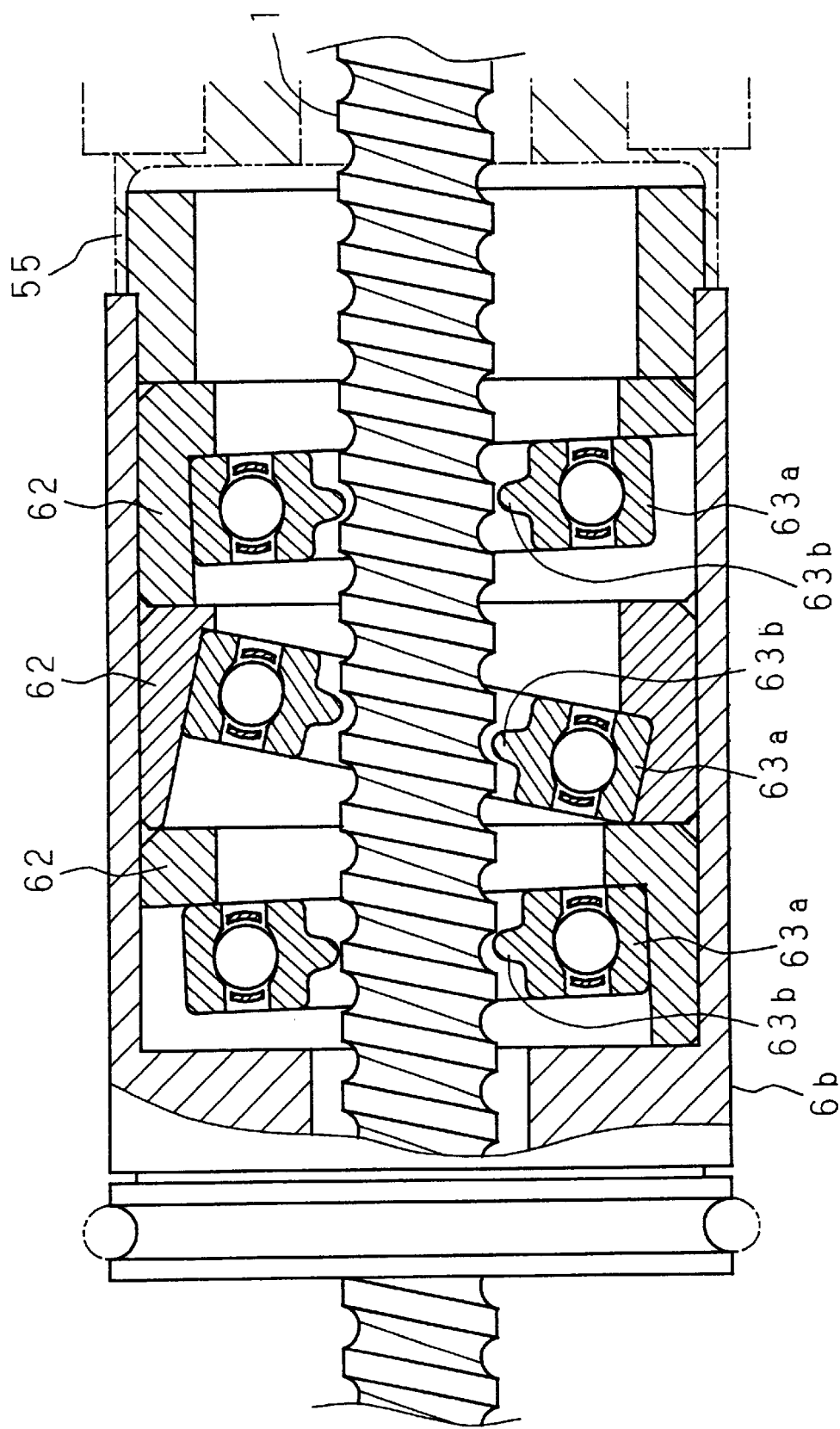
FIG. 6 is a portionially enlarged view of FIG. 5.

FIG. 6 is a portionial enlarged view of FIG. 5. In FIG. 6, in the hollow portion formed inside the rotary cylinder 6b there are fixed three ball bearings 63a, 63a, 63a of the same constitution as that of the first embodiment coaxially with the steering shaft 1 through the three bearing holders 62, 62, 62.

The power steering apparatus of this embodiment is constituted as above, and according to its rotation of the rotary cylinder 6b, it performs steering assistance similar to that of the first embodiment. Since other constitution, action and effect are similar to those of the first embodiment, the same numerals are assigned to the corresponding portions and further explanation will be omitted to avoid duplication.

Industrial Applicability

As stated in detail above, in the power steering apparatus of the present invention, a plurality of feed rings provided in inclination to the axial center rotate while being in sliding contact at one spot with the inside of the rotary cylinder. Accordingly, it is possible to convert the rotation of the motor for steering assistance to the movement in the axial direction of the steering shaft in a simple mechanism. As it does not necessitate a ball such as the ball screw mechanism, the noise is suppressed, and an expensive ball screw mechanism is not required. Furthermore, by using a commonly used bearing, the apparatus can be constituted at a lower cost.

As the projection provided on the inner circumferential surface of the feed ring is in sliding contact with the spiral groove provided on the steering shaft, the rotation of the motor for steering assistance can be securely converted to the movement in the axial direction without slippage of the steering shaft in the axial direction on the sliding surface.

Furthermore, the present invention has excellent effects such that, because the above feed ring is held in inclined or eccentric condition by the above holder, in assembling into the rotary cylinder it suffices to adjust only the inner circumferential surface of the feed ring and the sliding pressure of the steering shaft.

What is claimed is:

1. A power steering apparatus for assisting steering by transmitting rotational force of a motor driven according to steering to a steering shaft supported in a housing and moving said steering shaft in the axial direction of the shaft, comprising:

a rotary cylinder supported in said housing by restraining the movement in the axial direction and rotating coaxially with said steering shaft by transmitting of the movement from the motor, at least one feed ring fixed in said rotary cylinder with inclination at a predetermined angle and eccentricity by a predetermined distance to the axial center of said steering shaft;

said feed ring being held by a holder which is fixed in said rotary cylinder, and said holder being furnished with a columnar recess for holding said feed ring with its axial center inclined and eccentric to said steering shaft and said holder being a bottomed cylindrical member having a hole at the middle portion of the bottom through which the steering shaft can be inserted, comprising an inner circumferential surface with an inclined and eccentric axial center to the outer circumferential surface, and an inner bottom surface which is provided at a right angle to the direction of inclination of said inner circumferential surface, with the circumferential wall having a gap extending circumferentially over more than half of the inner circumferential surface, a screw hole being provided in the radial direction of the circumferential wall in a position opposite to the lacking portion on said circumferential wall, so that an adjusting screw projecting from the outside of said circumferential wall to inside can be received in said screw hole.

2. The power steering apparatus according to claim 1, wherein the axial center of the recess is inclined by the same angle as that of said feed ring, and is eccentric with said steering shaft by the same distance as that of said feed ring.

3. An apparatus in accordance with claim 2, comprising a plurality of feed rings which are fixed in said rotary cylinder at equal angles of inclination and equal eccentricity distances from the axial center of said steering shaft, said feed rings being fixed to the inside of said rotary cylinder with substantially equal displacement of the respective eccentric positions in the circumferential direction.

4. The power steering apparatus according to claim 1, wherein the holder further comprises an adjusting screw which is received in said screw hole.

5. An apparatus in accordance with claim 4, comprising a plurality of feed rings which are fixed in said rotary cylinder at equal angles of inclination and equal eccentricity distances from the axial center of said steering shaft, said feed rings being fixed to the inside of said rotary cylinder with substantially equal displacement of the respective eccentric positions in the circumferential direction.

6. An apparatus in accordance with claim 1, comprising a plurality of feed rings which are fixed in said rotary cylinder at equal angles of inclination and equal eccentricity distances from the axial center of said steering shaft, said feed rings being fixed to the inside of said rotary cylinder with substantially equal displacement of the respective eccentric positions in the circumferential direction.

7. A power steering apparatus for assisting steering by transmitting to a steering shaft the rotational force of a motor driven in accordance with steering, the steering shaft having a spiral groove formed in the circumference thereof that is supported within a housing so as to restrain its rotation but so as to be movable in its axial direction, said apparatus comprising:

a rotary cylinder supported in the housing so as to have its movement restrained in the axial direction, rotated by the force transmitted from the motor and provided with the steering shaft therein;

a plurality of feed rings composed of bearings each having an inner diameter larger than an outer diameter of the steering shaft;

a holder for holding the feed rings within the rotary cylinder by engaging the feed rings with the spiral groove formed in the outer circumference of the steering shaft at a predetermined angle; and an adjuster making the rotational center of the rotary cylinder coincide with the axial center of the steering shaft supported by the plurality of feed rings.

8. The power steering apparatus of claim 7 wherein the holder is a cylinder comprising:

a columnar recess for holding the feed ring having its axial center inclined and eccentric to the steering shaft; and a hole provided at the bottom portion of the holder, through which the steering shaft can be inserted.

9. The power steering apparatus of claim 7 wherein the groove of the steering shaft is formed with a pitch such that a feed ring has an inclination angle which is a lead angle.

10. The power steering apparatus of claim 7 wherein the adjuster moves the feed rings at the predetermined angle at which the holder holds the feed ring.

11. The power steering apparatus of claim 7 wherein the rotary cylinder is supported inside the housing by a contact ball bearing.

* * * * *

UNITED STATES PATENT AND TRADEMARK OFFICE
CERTIFICATE OF CORRECTION

| | | |
|---|---|---|
| PATENT NO. | : 6,227,064 B1 | |
| APPLICATION NO. | : 09/173036 | |
| DATED | : May 8, 2001 | |
| INVENTOR(S) | : Masahide Nakamura | |

It is certified that error appears in the above-identified patent and that said Letters Patent is hereby corrected as shown below:

Title page, [75] Inventor, change

"Kashihara, (JP)" to -- Nara (JP)--.

Title page, [30] Foreign Application Priority Data, change

"February 28, 1998" to --February 28 1997--.

Signed and Sealed this

Sixteenth Day of January, 2007

JON W. DUDAS
*Director of the United States Patent and Trademark Office*